SIGNAL ACTUATED TUNER CONTROL
Filed June 1, 1950
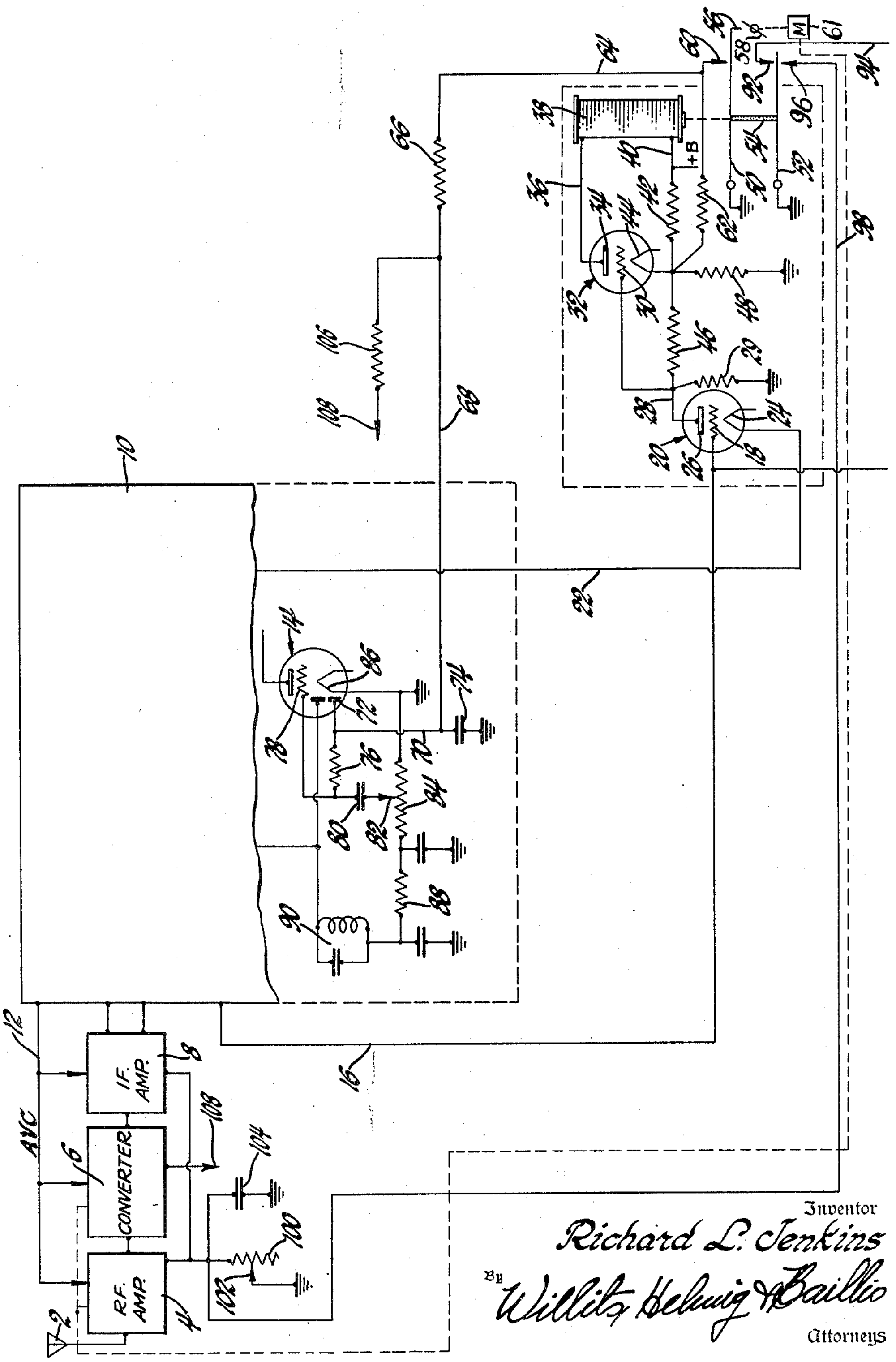
Inventor
Richard L. Jenkins
By Willits, Helwig & Baillio
Attorneys Patented Sept. 28, 1954 2,690,506

UNITED STATES PATENT OFFICE 2,690,506

SIGNAL ACTUATED TUNER CONTROL

Richard L. Jenkins, Kokomo, Ind., assignor to General Motors Corporation, Detroit, Mich., a corporation of Delaware Application June 1, 1950, Serial No. 165,430

8 Claims. (Cl. 250—20)

This invention relates to automatic tuning means for radio receiving sets and more particularly to means used in conjunction with so-called stop-on-station tuning means or signal seeking tuner means. Receivers have been utilized in which means have been provided to cause the tuning means to continuously scan the spectrum over which they are designed to operate. Indexing means is also provided which, upon the receipt by the receiver of an incoming signal, creates a voltage to cause the tuning means to be indexed or stopped. Stop-on-station tuners of this design are disclosed in co-pending application S. N. 759,042, Schwarz and Guyton, filed July 5, 1947, which issued April 24, 1951, as Patent No. 2,550,430.

In this general type of control equipment there is provided a relay which is energized to permit the motive driving means to operate and the tuner to be driven and scan the band. When an incoming signal is received, an electronic tube which conducts to energize the relay is biased near cut off and the relay is deenergized. This deenergization causes a substantially immediate cessation of movement due to the motive means and the tuning means, therefore, remains at that position until the apparatus is next energized to cause the set to proceed to the next station. During the operation of the tuning means it is desirable to mute or squelch the receiver so that noise from static, squeals, etc., will not emanate from the speaker.

It is therefore an object of my invention to provide means in a signal seeking control circuit to give positive action to the control relay.

It is a further object of my invention to provide a control system for the relay which, once deenergized, will not again be reenergized except on a positive actuation by the operator.

It is a still further object of my invention to provide in a signal seeking tuning system utilizing electron tube control, means for preventing excess voltage on the electrodes of the control tube which might cause a burning out thereof.

It is a still further object of my invention in a signal seeking or stop-on-carrier tuner to provide a squelch or muting circuit to the audio amplifier to deenergize the loud speaker during tuning periods.

With these and other objects in view which will become apparent as the specification proceeds, my invention will be best understood by reference to the following specification and claims and the illustrations in the accompanying drawings, in which:

The figure is a schematic diagram partially block and partially circuit of those parts of a signal seeking tuning broadcast receiver which incorporate my invention.

Referring now more specifically to the drawing, there is shown therein a receiving antenna 2 which is directly connected to an R. F. amplifier section 4, in turn coupled to a converter or mixer section 6, which feeds an I. F. amplifier section 8. The output of the I. F. amplifier section 8 feeds into a detector and audio section 10 in which an AVC voltage is developed and fed back in inverse phase on line 12 to the R. F. amplifier converter and I. F. amplifier. In the detector and audio amplifier section which is shown generally as a block diagram, there is specifically illustrated the first audio amplifier tube indicated generally at 14. A control voltage for the trigger tube of the stop-on-signal tuner is developed on line 16 in the detector section 10, which line is directly connected to the grid 18 of the trigger tube 20. The other control line 22, leading from the detector section, is connected directly to the cathode 24 of tube 20, the trigger voltage being developed between line 16 and 22. With no carrier signal tuned in the line 16 is negative with respect to line 22 and grid 18 therefore prevents the tube from conducting. However when a carrier is tuned in to the amplifier a positive voltage is developed on line 16 causing the potential on grid 18 to rise sufficiently to permit the tube 20 to conduct.

The plate 26 of the tube 20 is connected through line 28 with the grid 30 of relay tube 32 and by resistor 29 to ground. Resistor 29 provides slight initial bias for grid 30 of tube 32 through resistor 46. The plate 34 of tube 32 is connected directly by line 36 to one terminal of the control relay coil 38. The opposite terminal of the coil 38 is connected through line 40 to a voltage supply labeled B+ and also to a resistor 42. Resistor 42 is also connected directly to cathode 44. A resistor 46 is connected between the cathode 44 and conductor 28. A resistor 48 interconnects cathode 44 with the ground. Relay coil 38 physically moves a plurality of armatures 50 and 52, which are mounted in spaced relation, one end of each of which is grounded. Insulating means 54 separates these two movable armatures but causes them to move in unison.

Armature 50 has on its outer end a flanged dog section 56 which is adapted to physically engage a rotating motive part 58 on the tuning driving means 61 to cause the tuning means to stop when engaged but release it for movement when it is moved out of the way. Armature 50 is also adapted to, in its raised position, engage a fixed contact 60 which is conductively connected through resistor 62 to the cathode 44 of tube 32. It is also connected through conductive line 64 to a resistor 66, the opposite terminal of which is connected through line 68 and line 70 to a diode-anode 72 in the first audio amplifier tube 14. A condenser 74 is connected between line 70 and ground. One terminal of a resistor 106 is connected to line 68 and the opposite end through line 108 to the oscillator grid (not shown). A resistor 76 is connected between diode 72 and control grid 78 of tube 14. A condenser 80 is connected between control grid 78 and a movable tap 82 on variable resistor 84, one end of which is connected to the cathode 86 of the tube 14 and the other end connected to a resistor 88 in turn connected to the secondary resonant circuit 90 of the intermediate frequency transformer. Variable tap 82 on resistor 84 acts as the volume control for the receiver.

A stationary contact 92 which is adapted to be engaged by the movable armature 52 when in its raised position, is connected through line 94 with a control circuit to the motive means (not shown). Fixed contact 96, adapted to be engaged by the armature 52 when in its lowermost or deenergized position, is connected through line 98 to the cathode circuits of the R. F. and I. F. amplifiers. A radio frequency bypass condenser 104 is connected to ground from line 98. A variable resistance 100 is also connected to this line which is engaged by movable tap 102, which is grounded, these parts forming the sensitivity control for the receiver.

In the operation of the portion of the control system shown herein, when the tuner is scanning or searching the band, relay 38 is energized, attracting its armatures 50 and 52 to move them to their raised position. This moves the flanged tip 56 out of the path of the rotating motive means 58, permitting the means to operate and scan. The tube 32 is energized to conduct to complete the circuit for the coil 38 and the tube 20 or trigger tube is nonconductive, being biased to cut off. The resistor 62 is of a relatively low value, thus maintaining a low impedance path in the circuit of the tube. At this time also it will be noted that the armature 50 is in contact with its upper stationary contact 60 thus grounding one end of resistor 66, and resulting in appearance of a negative voltage across the same from the oscillator grid source through resistor 106. This negative voltage is applied through lines 68 and 70 and resistor 76 to grid 78 of the first audio amplifier tube 14, applying a "squelch" to the first audio amplifier.

When a signal is tuned in, a voltage appears across lines 16 and 22, raising the potential of control grid 18 with respect to cathode 24 to permit tube 20 to conduct, which conductance through resistor 46 lowers the potential of the control grid 30 of tube 32, causing this tube to cease conducting and armatures 50 and 52 of relay 38 to drop. When this occurs, the low impedance path 62 of the cathode 44 is opened and the squelch circuit 64, 66, 68 is also disconnected from ground, line 64 raising to a positive potential supplied through resistor 62. A portion of this voltage appears on line 68, charging condenser 74 and raising the diode 72 through line 70 to cathode 86 potential where it becomes conductive, thus establishing a bias level for grid 78 through resistor 76 such that audio amplifier tube 14 becomes effective to amplify. At this time it is desired to replace the low impedance path 62 from the cathode with a high impedance path and this is provided by a relatively high resistance 48 between cathode 44 and ground. This maintains the cathode voltage down so that it will not be sufficient to cause the tube to burn out. Otherwise the impedance from cathode 44 to ground in proportion to the circuit impedance from line 40 to ground would be such that cathode voltage might tend to rise to the plate voltage and the tube might burn out or short out.

I claim:

1. In radio receiving means, power actuated tuning means for scanning the spectrum between prescribed limits, conductive means upon which a voltage is developed by an incoming signal, electronic means connected to said conductive means and controlled by the voltage thereof, relay means connected to the output of the electronic means and controlled thereby, combined indexing and switching means operated by the relay means to control the power actuated tuning means, and a plurality of impedance means connected in parallel and of the same character but of different values connected to the electronic means and through which energizing current for the relay coil flows, a portion of which are alternately included in circuit with the electronic means or out of circuit when the relay is energized or deenergized respectively.

2. In radio receiving means, power actuated tuning means for scanning the spectrum between prescribed limits, relay means controlling the power actuated means, an electron tube having a cathode, grid and plate controlling the relay means, a plurality of impedances connected in parallel and of the same character but of different values connected to the cathode of the tube and switching means operated by the relay and connected to in circuit with one impedance to change the total impedance in the tube circuit.

3. In radio receiving means having radio and audio amplifier sections and a detector section, power actuated tuning means for scanning the spectrum, relay means for controlling the operation of the power actuated means, electronic means having a grid, cathode and plate connected to and controlling the relay means, conductive means upon which a voltage is developed by an incoming signal connected to said electronic means to control the same, a grounded switching arm actuated by said relay, a contact cooperating therewith and connected to the audio amplifier, an impedance of relatively low value connected between the cathode of the electronic means and the contact, a second impedance of much higher value connected between the cathode and ground so that as the switch arm is actuated by the relay the audio amplifier will be disabled by grounding and a low impedance path established for the electronic means.

4. In radio receiving means, power actuated tuning means for scanning the high frequency spectrum between prescribed limits, relay switching and indexing means controlling the operation of the power tuning means, electron tube means having an input and an output circuit, said output circuit being directly connected to said relay means and controlling the operation thereof, a plurality of impedance means of the same character but of differing value connected in parallel in the output circuit, one of which is connected to the switching means to include or remove one of the impedances from the output circuit upon operation of the relay.

5. In radio receiving means, power actuated tuning means for scanning the high frequency spectrum between prescribed limits, relay switching and indexing means controlling the operation of the power tuning means, electron tube means having an input and an output circuit, said output circuit being connected to said relay means and controlling the operation thereof, conductive means upon which a voltage is developed by an incoming signal connected to the input circuit of the tube, a plurality of resistors of different values connected in parallel in the output circuit of the tube through which tube current flows, one of said resistors being connected to said relay switching means so that the resistors are connected in parallel in the tube circuit for one switch position and one resistor is removed from the circuit when the switch is in the alternate position.

6. In radio receiving means, power actuated tuning means for scanning the high frequency spectrum between prescribed limits, relay switching and indexing means controlling the operation of the power tuning means, an electron tube having a cathode, grid and plate, said relay switching means being connected to the cathode and plate, a plurality of resistors of different values connected in parallel between the cathode and ground and switching means connected to one of the resistors actuated by the relay.

7. In radio receiving means having radio and audio amplifying and detecting sections and means to tune the receiver over a predetermined frequency spectrum, driving means to move the tuning means in either direction over said spectrum, conductive means connected to the detector section upon which a voltage is developed upon receipt of an incoming signal, a pair of triode tubes having cathode, grid and plate electrodes connected in cascade, said conducting means being connected to the grid of the first tube, a relay connected to the plate of the second tube to be energized when this tube is conducting, and a plurality of resistances of widely differing values connected in parallel in the cathode circuit of the second triode, and switching means operated by the relay to control the driving means connected to the resistance of lower value to switch it into and out of the cathode circuit on relay actuation.

8. In radio receiving means having radio and audio amplifier sections, a detector section and tuning means, driving means to move the tuning means over the frequency spectrum, switching means controlling the driving means, relay means operating the switching means, conductive means upon which a control pulse is generated by the appearance of an incoming signal, electronic means having a cathode, grid and anode, means connecting the conductive means to the control grid, said relay means being connected to the anode, a plurality of resistors of differing value connected in parallel to the cathode, and means connecting one resistor to the switching means to cause it to be included or removed from the circuit with the opening and closing of the switching means.

References Cited in the file of this patent

UNITED STATES PATENTS

| Number | Name | Date |
|---|---|---|
| 2,262,218 | Andrews | Nov. 11, 1941 |
| 2,326,737 | Andrews | Aug. 17, 1943 |
| 2,493,741 | Andrews | Jan. 10, 1950 |
| 2,499,573 | Dunn | Mar. 7, 1950 |
| 2,516,856 | Cowles | Aug. 1, 1950 |
| 2,526,266 | O'Brien | Oct. 17, 1950 |
| 2,541,017 | Alexander | Feb. 13, 1951 |
| 2,550,430 | Schwarz | Apr. 24, 1951 |